US009563605B1

(12) United States Patent
Bergquist et al.

(10) Patent No.: US 9,563,605 B1
(45) Date of Patent: Feb. 7, 2017

(54) COMMAND CENTER SYSTEM AND METHOD

(75) Inventors: Aaron M. Bergquist, Maple Plain, MN (US); Tanea Marie Bement, Stillwater, MN (US); Bray Alexander Wheeler, Northfield, MN (US); Ann Michelle Mielke, Cottage Grove, MN (US)

(73) Assignee: Target Brands, Inc., Minneapolis, MN (US)

( * ) Notice: Subject to any disclaimer, the term of this patent is extended or adjusted under 35 U.S.C. 154(b) by 456 days.

(21) Appl. No.: 13/482,424

(22) Filed: May 29, 2012

(51) Int. Cl.
*G06F 17/00* (2006.01)
*G06F 17/21* (2006.01)
*G06F 17/27* (2006.01)

(52) U.S. Cl.
CPC ......... *G06F 17/211* (2013.01); *G06F 17/2745* (2013.01); *A63F 2300/5553* (2013.01); *A63F 2300/6623* (2013.01)

(58) Field of Classification Search
CPC .......... G06F 17/24; G06F 17/25; G06T 11/60; A63F 2300/5553; A63F 2300/6623
USPC ............. 715/205, 201, 202, 230, 255; 705/9
See application file for complete search history.

(56) References Cited

U.S. PATENT DOCUMENTS

| | | | |
|---|---|---|---|
| 7,464,004 B2 | 12/2008 | Das et al. | |
| 2003/0125998 A1 | 7/2003 | McKenney et al. | |
| 2003/0135378 A1 | 7/2003 | Carlson et al. | |
| 2005/0055407 A1* | 3/2005 | Tandler | H04L 12/58 709/206 |
| 2005/0149289 A1 | 7/2005 | Whaling et al. | |
| 2006/0211404 A1* | 9/2006 | Cromp | G06Q 10/06 455/405 |
| 2007/0294258 A1 | 12/2007 | Caldwell et al. | |
| 2008/0133300 A1 | 6/2008 | Jalinous | |
| 2009/0055720 A1 | 2/2009 | Ngo et al. | |
| 2009/0319180 A1 | 12/2009 | Robinson et al. | |
| 2010/0274616 A1* | 10/2010 | Grace | G06Q 10/063 705/7.11 |
| 2010/0275054 A1 | 10/2010 | Grace et al. | |
| 2010/0324958 A1* | 12/2010 | Stiles | G06Q 10/06 705/7.28 |
| 2011/0161085 A1* | 6/2011 | Boda | G06Q 30/02 704/260 |
| 2012/0274616 A1* | 11/2012 | Scribner et al. | 345/205 |
| 2013/0238356 A1* | 9/2013 | Torii | G06Q 10/06 705/2 |

* cited by examiner

*Primary Examiner* — Patrick Riegler
*Assistant Examiner* — Jenq-Kang Chu
(74) *Attorney, Agent, or Firm* — Merek, Blackmon & Voorhees, LLC

(57) ABSTRACT

A command center system includes forms to receive incident data describing an incident and at least one incident list that is populated with incident data from the input forms. The system also includes a status page that includes a list of links to incident pages, each incident page constructed from incident data in the at least one incident list. The status page also includes a daily briefing link to a daily briefing page that is constructed once per day from incident data in the at least one incident list such that incident data added after the current daily briefing page is constructed are not included in the daily briefing page. The status page also includes an incident content feed link for a content feed of incident data added to the at least one incident list and a daily briefing content feed link for a content feed of daily briefing pages.

19 Claims, 14 Drawing Sheets

402

Incident Recap

404 — If you are using a mobile phone, please view the attached PDF for better readability

Incident 406 408
1/2/2012 – 6:20 – Evacuation – R-1 Store1234 – Orem, UT

Incident Summary
The store evacuated for approximately 40 minutes due to a false fire alarm. The store has returned to business as usual. —410

Incident Details

Incident Type: Evacuation —412
Impact: Low —414
Weapon Used: No —416
Injuries: Team Members: No —418
Guests: No —420
Subject[s]: No —422
Facility Damaged: No —424
Merchandise Taken: No —426
Emergency Response: Yes —428
Law Enforcement: No — 430
Fire Department: Yes — 432
Paramedics: No — 434
Bomb Squad: No — 436
Video of Incident: Yes —438
Media Onsite: No —440
Statement Released: No —442

Contact Information

Command Center: Jane Doe 612-555-5555 —446
Field Leader: John Smith —448  —444
Leader Pyramid: Assets Protection —450

400  FIG. 4

COMMAND CENTER SYSTEM AND METHOD

BACKGROUND

Many corporations and government agencies have employees traveling around the world. In addition, they have facilities in different parts of the world. In order to protect their employees and facilities, such entities monitor global headlines and travel alerts for events that may pose a threat to their people or property. For example, the headlines may be monitored for weather events and political instability. In addition, corporations and government agencies monitor incidents that occur at their facilities.

The discussion above is merely provided for general background information and is not intended to be used as an aid in determining the scope of the claimed subject matter. The claimed subject matter is not limited to implementations that solve any or all disadvantages noted in the background.

SUMMARY

A command center system includes forms to receive incident data describing an incident and at least one incident list that is populated with incident data from the input forms. The system also includes a status page that includes a list of links to incident pages, each incident page constructed from incident data in the at least one incident list. The status page also includes a daily briefing link to a daily briefing page that is constructed once per day from incident data in the at least one incident list such that incident data added after the current daily briefing page is constructed are not included in the daily briefing page. The status page also includes an incident content feed link for a content feed of incident data added to the at least one incident list and a daily briefing content feed link for a content feed of daily briefing pages.

In accordance with further embodiments, a daily briefing template is retrieved in response to a user input. A current date and time is determined and a processor searches incident data lists stored in memory to retrieve information about currently active incidents and closed incidents that were closed within one day of the current date and time. A global headline lists stored in memory is searched for information about global headlines that are applicable to the current date and time. A daily briefing page is constructed by inserting the information about currently active incidents, the information about closed incidents and the information about global headlines into the briefing template. The constructed daily briefing page is then provided to a user through a user interface.

In accordance with a further embodiment, incident data is received through a form comprising at least one pull-down menu that is used to select a location where the incident occurred from a collection of preset locations. A daily briefing is then constructed by selecting incident data to include in the daily briefing based in part on a current date; selecting travel alerts to include in the daily briefing based in part on the current date; and selecting headlines to include in the daily briefing based in part on the current date. The daily briefing is provided to a user and changes to the daily briefing are received from the user. The daily briefing is altered based on the changes from the user to form an altered daily briefing that is saved in memory.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is an example of an incident recap.

DETAILED DESCRIPTION

In accordance with the embodiments described below, a command center system is provided that collects information about incidents using incident input forms as well as information about global headlines, travel alerts, and command center on-call personnel. This information is stored in data structures that are then accessed to generate one or more pages or documents that convey information about currently occurring events, recently resolved events, global news events, travel alerts, and in some cases whether a response team has been activated to respond to a given event.

Figure 1:
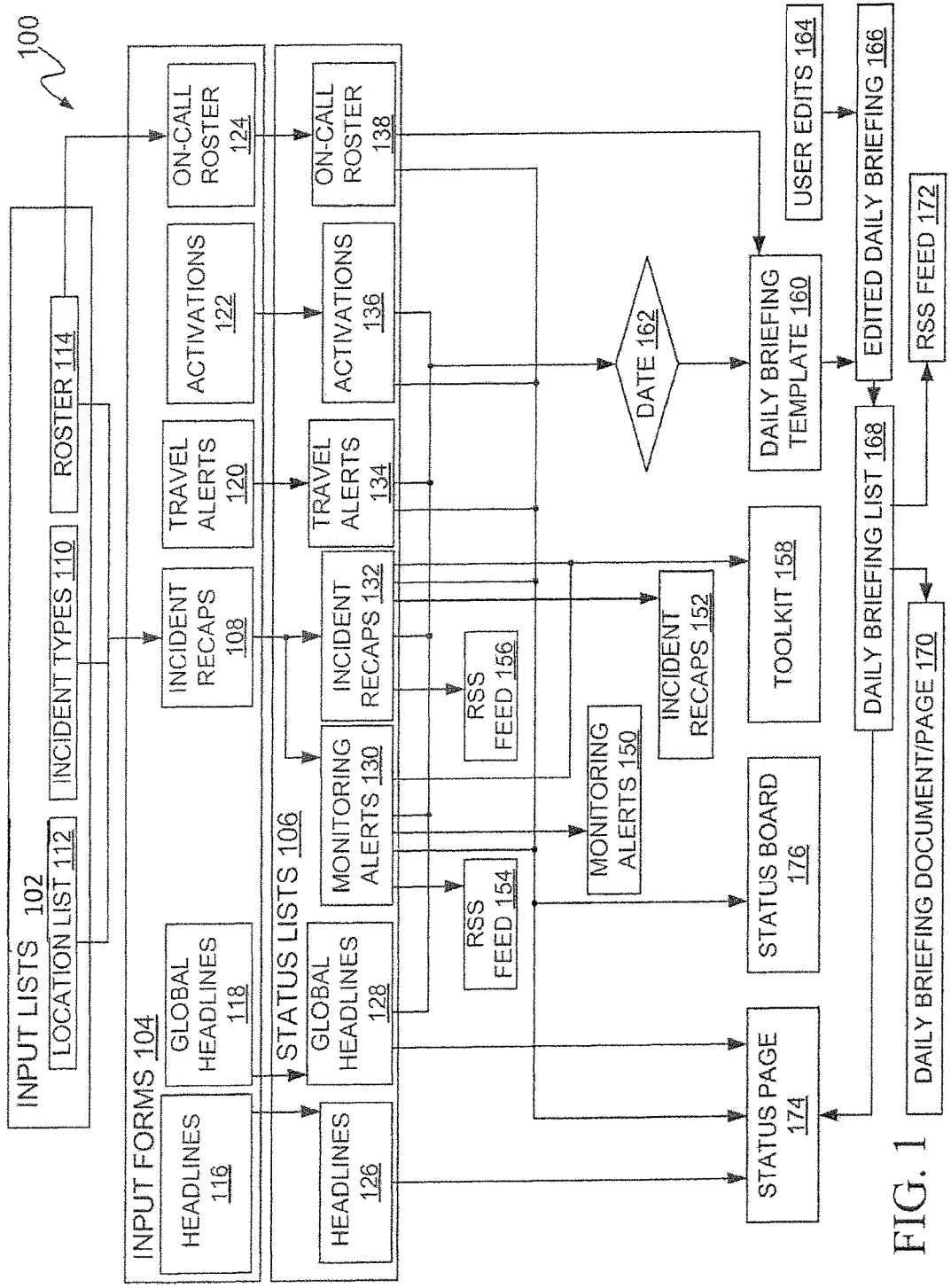
FIG. 1 is a block diagram of elements in a command center reporting system.

FIG. 1 provides a block diagram of a command center system 100. Command center system 100 includes input lists 102, input forms 104, and status lists 106. Input lists 102 are data structures containing information that can be used to populate pull-down lists in one or more input forms 104. In accordance with one embodiment, input lists 102 contain multiple columns and multiple rows with each column providing a separate field and each row providing a separate entry. Input forms 104 are pages or documents that can receive user input in one or more fields within the forms. When one of input forms 104 is submitted, its data is collected and placed into one or more status lists 106. Status lists 106 are data structures with multiple columns and multiple rows. The information in status lists 106 is used to construct one or more output pages discussed further below.

Figure 2:
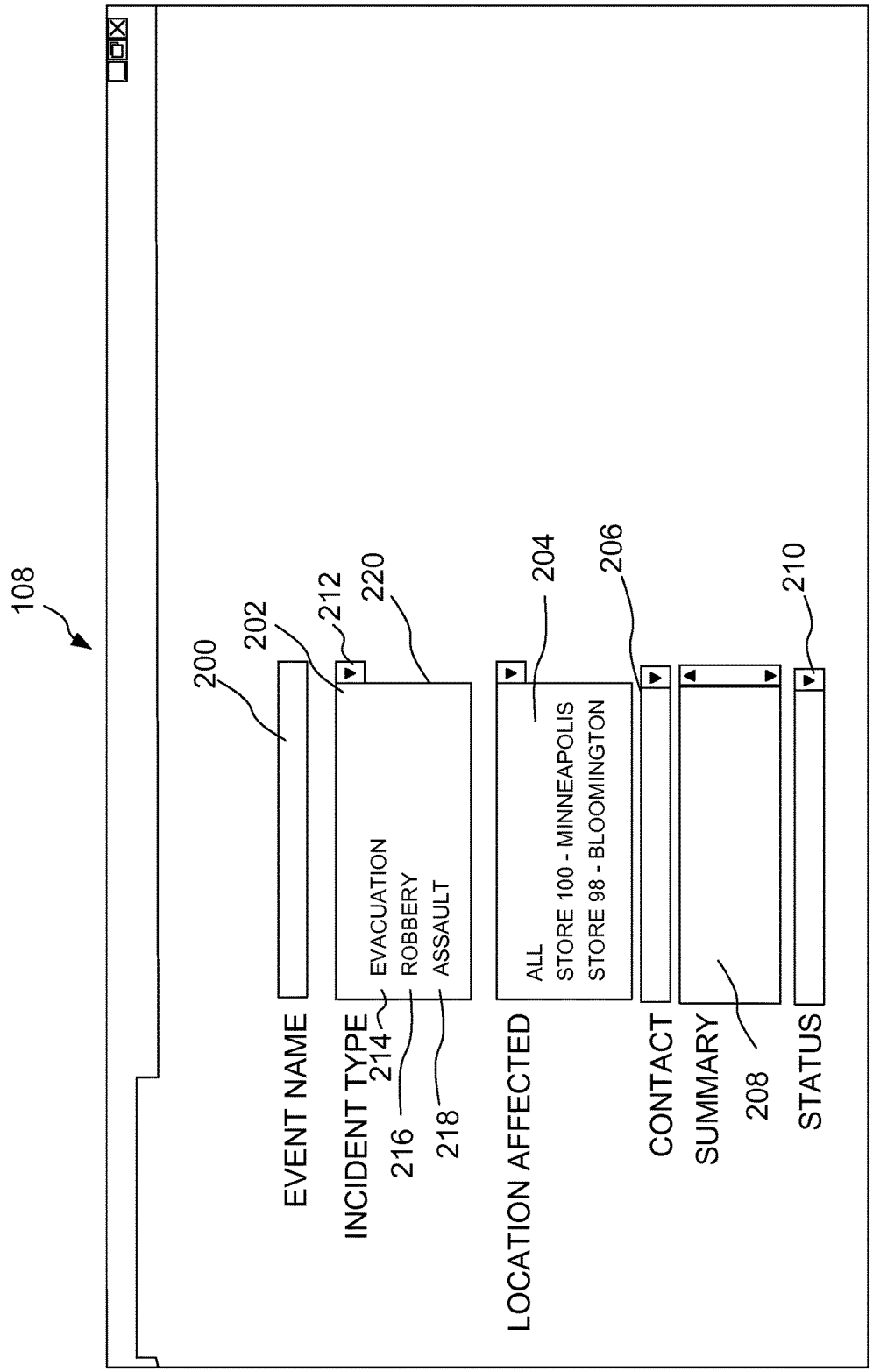
FIG. 2 is an example of a form for entering incident data.

FIG. 2 provides an example of an incidents input form 108 of input forms 104. Incidents input form 108 is displayed on a computing device display and accepts input into a number of fields such as event name field 200, incident type field 202, locations affected field 204, contact field 206, summary field 208, and status field 210. Incident type field 202, locations affected field 204, contact field 206, and status field 210 are pull down lists fields that include a pull-down control such as pull-down control 212 of incident type field 202. When a pull-down control 212 is activated, a list of selectable entries for the field is presented. For example, for incident type field 202 a list of incidents including evacuation, robbery, and assault entries 214, 216, and 218 are provided in a pull-down list 220. The entries in pull-down list 220 are taken from an incident types input list 110 which lists all available incidents that may be inserted in incident input form 108. Similarly, the pull-down list for locations affected is taken from a location list 112 and the contact in the command center who is handling the incident is listed in a pull-down list for entry 206 which is populated with values from roster list 114. Location list 112 comprises a collection of preset locations.

Input forms 104 also include command center headlines form 116, global headlines form 118, travel alerts form 120, activations form 112, and on-call roster form 124.

Command center headlines form 116 is used to store information in command center headlines list 126. Such information includes a name for the headline, a date and time associated with the headline, and a summary for the headline. Command center headlines are short stories about events that are particular to the command center but are not necessarily relevant to an entire corporation.

Global headlines form 118 is used to populate global headlines status list 128. Global headlines form 118 includes entry fields for the title of the headline, a date and time for the headline, a summary of the global headline event, and an ability to insert an image by providing a file path to the image. Global headlines status list 128 contains headlines that are generally found on news services and generally describe events taking place throughout the world.

Incidents input form 108 is used to provide incident data for incident lists including monitoring alerts list 130 and incident recaps list 132. Monitoring alerts list 130 contains currently active incidents that continue to be monitored by command center personnel. Incident recaps list 132 contains information about past incidents that have been closed by command center personnel and are no longer being actively monitored. Monitoring alerts list 130 includes columns such as the date and time that the incident began, a title for the incident, a summary of the incident, the distance between the location of the incident and a closest facility, the number of injured, the number of fatalities, whether emergency response was called, the type of emergency response that arrived, whether there is media present, whether this will impact travelers, and whether this will impact the operation of the facility. For example, if the facility is a store, monitoring alerts list 130 will indicate whether the store is still open for business and whether the store is operating at a diminished capacity. Incident recaps list 132 provides information about past incidents that are no longer being monitored by the command center. Incident recaps list 132 includes information such as the date and time of the incident, the locations affected by the incident, the type of incident, the impact to the corporation, whether a weapon was used, injuries to employees, guests, or the subject involved in the incident, whether the facility was damaged, whether merchandise was taken, and whether an emergency response arrived at the scene. If an emergency response team arrived at the scene, incident recaps list 132 further indicates whether it was law enforcement, fire department, paramedics, or bomb squad. Incident recaps list 132 also includes an indication of whether there is a video of the incident, whether media is on site, and whether the command center has released a statement about the incident. Incident recaps list 132 will also include contact information of different people to contact to receive more information about the incident.

Travel alerts input form 120 provides data for a travel alerts list 134. This data includes the dates that the travel alert is active for, the locations affected by the travel alert, and a summary of the reasons for the travel alert.

Activations input form 122 is used to input information into activations list 136 which describes teams that have been activated to respond to an incident. Activations list 136 includes a level of activation, members of the team that has been activated, and the current status of that team.

On-call roster input form 124 is used to designate the personnel currently on-call in the command center. This information includes the name of the on-call person, the contact information for the on-call person, and a link to an image of the on-call person, all of which is stored in on-call roster list 138.

Figure 3:
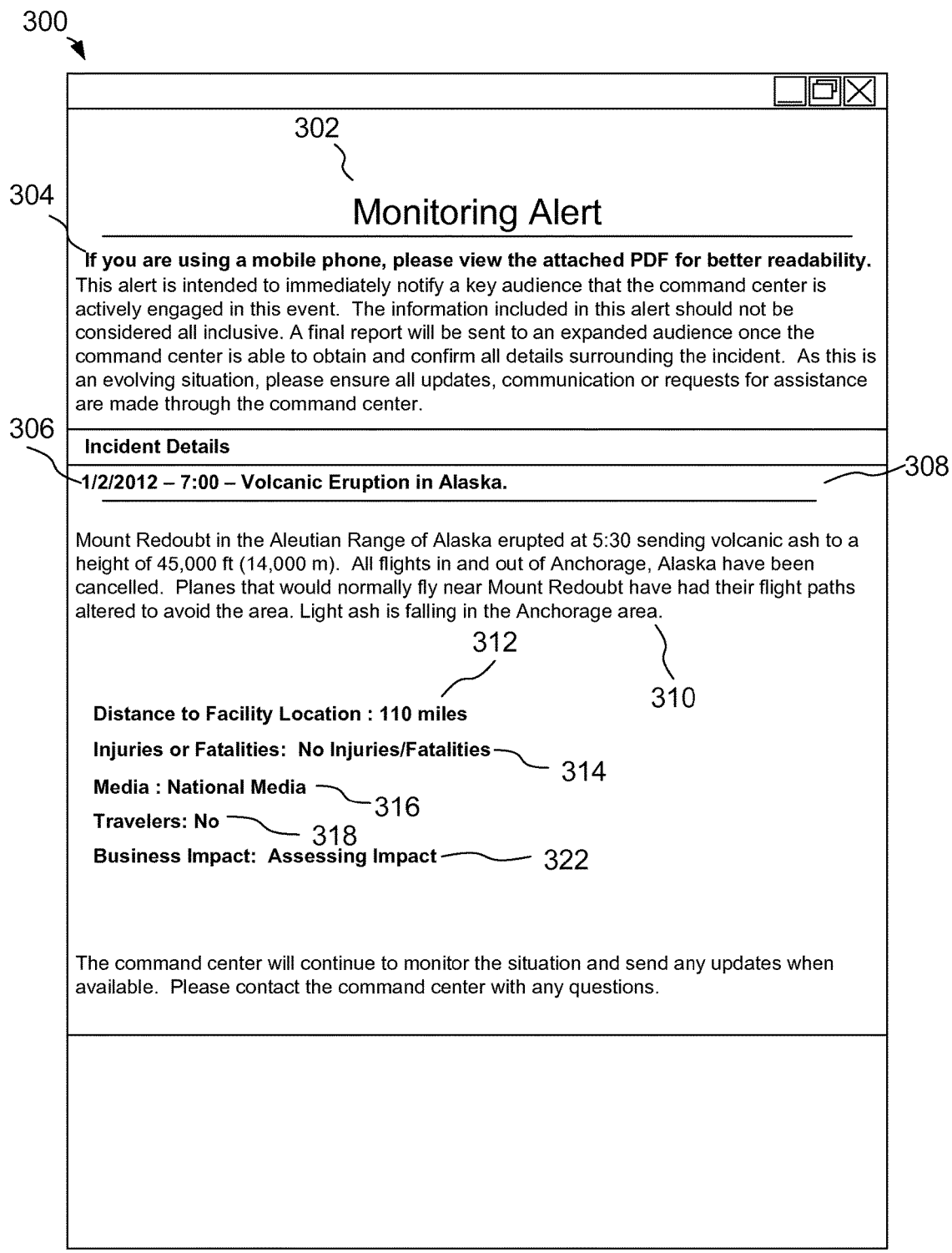
FIG. 3 is an example of a monitoring alert.

Data in monitoring alerts list 130 can be used to automatically form a monitoring alerts page 150. In particular, monitoring alerts page 150 is defined with a graphical layout that has areas that accept data from monitoring alerts list 130. When a user selects a monitoring alerts document, the document is dynamically constructed based on the selected criteria using the data in monitoring alerts list 130. FIG. 3 provides an example of a monitoring alert 300. Monitoring alert 300 includes a header 302, general alert information 304, a date and time 306, when the alert was created, a title 308, and a summary 310. In addition, monitoring alert 300 includes a distance to a facility location 312, injuries or fatalities 314, media presence 316, traveler impact 318, and business impact 322. In monitoring alert 300, information is taken from monitoring alerts list 130 to fill in fields 306, 308, 310, 312, 314, 316, 318, and 322. The remaining portions of monitoring alert 300 are part of a monitoring alert template.

Incident recaps list 132 is used to populate an incident recaps page 152. FIG. 4 provides an example 400 of an incident recap page 400. Incident recap page 400 includes a heading 402, a date 404, an incident type 406, and an affected location 408. Incident recap 400 also includes an incident summary 410, an incident type 412, an impact 414, whether a weapon was used 416, injuries to team members 418, Injuries to guests 420, injuries to subject 422, whether a facility was damaged 424, whether merchandise was taken 426, whether emergency response was called 428, and if emergency response was called whether law enforcement was called 430, the fire department was called 432, paramedics were called 434, or the bomb squad was called 436. Incident recap 400 also indicates whether there is video of the incident 438, whether media are on site 440, and whether the command center has released a statement 442. Incident recap 400 also includes contact information such as a contact name 444, contact number 446, field leader 448 and leader pyramid 450.

Figure 5:
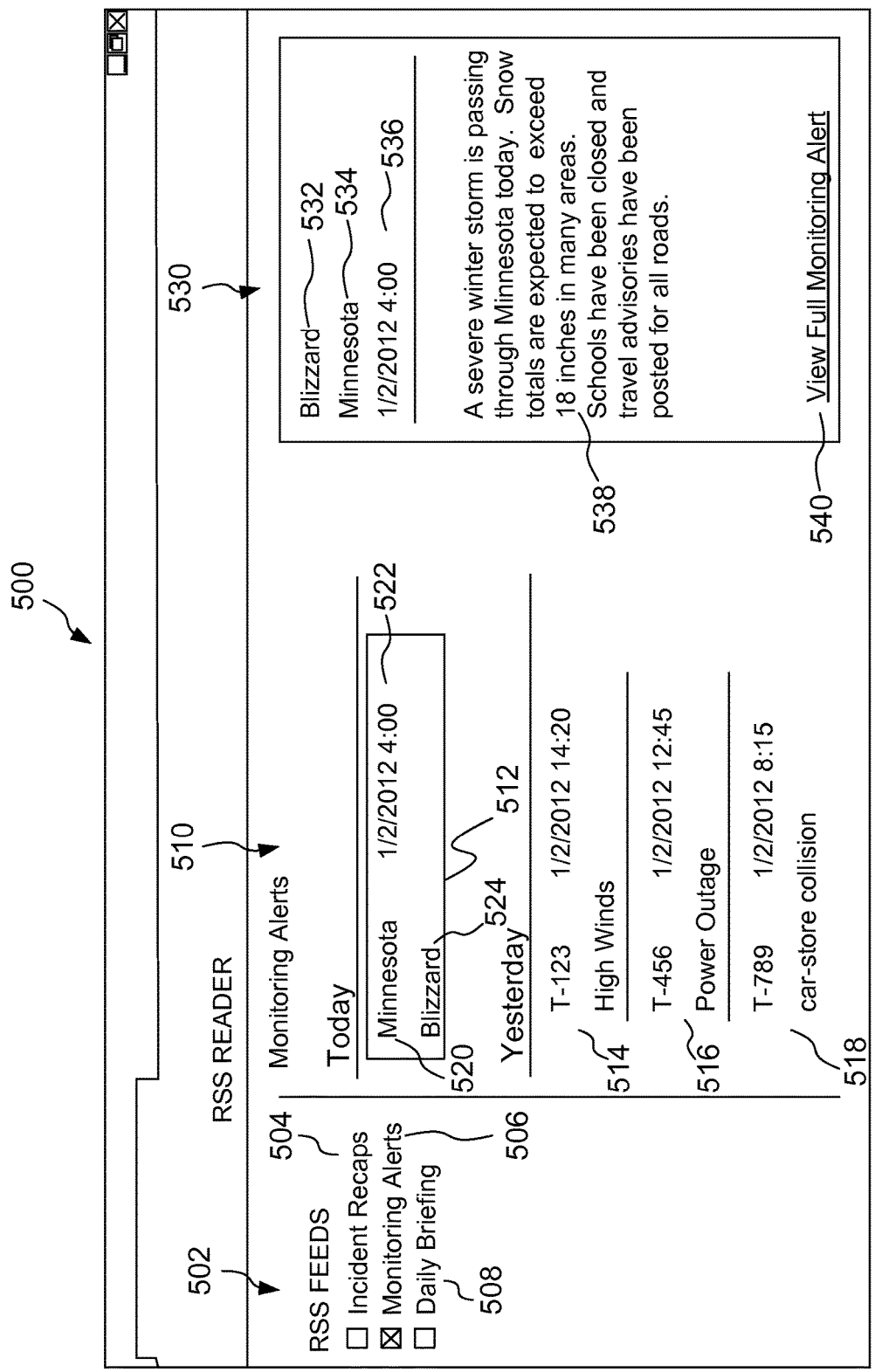
FIG. 5 is an example of an RSS reader showing monitoring alerts.

Monitoring alerts list 130 can also be used to construct an RSS feed document 154. RSS (originally RDF Site Summary, often dubbed Really Simple Syndication) is a family of web feed formats used to publish frequently updated works. An RSS feed is an XML document that is retrieved by an RSS reader that has been configured to periodically pull command center system 100 to retrieve a latest update to the monitoring alerts. Thus, when requested by an RSS reader, RSS feed 154 provides the latest monitoring alert(s) found in monitoring alert list 130. In accordance with some embodiments, RSS feed 154 has a different format from monitoring alerts 150. FIG. 5 provides an example of an RSS reader display 500 that displays a plurality of RSS feeds 154. RSS reader display 500 includes RSS feed selection column 502 that allows a user to select between an incident recap feed 504, monitoring alerts feed 506 and a daily briefing feed 508. RSS reader display 500 also includes a monitoring alerts column 510 that provides a list of monitoring alerts organized by date and time. For example, in FIG. 5, four monitoring alerts 512, 514, 516, and 518 are provided. Each monitoring alert includes a location affected by the event that is the subject to the monitoring alert 520, a date and time that the monitoring alert was started 522 and a title for the monitoring alert 524. RSS reader display 500 also includes a display column 530 in which monitoring alerts may be displayed. In display column 530, there is a title area 532, a location area 534, a date/time area 536, a summary area 538, and a link 540. Title 532, location 534, and date and time 536 provide the same information as title 524, location 520 and date/time 522 of column 510. Summary 538 provides a summary of the event that is the subject of the monitoring alert. Link 540 provides a link to a page such as monitoring alert page 150 that contains the complete monitoring alert.

Incident recaps list 132 may also be used to form a RSS feed 156. Using an RSS reader, a user can periodically poll incident recaps list 132 to find the latest closed incident(s) added to incident recaps list 132.

Figure 6:
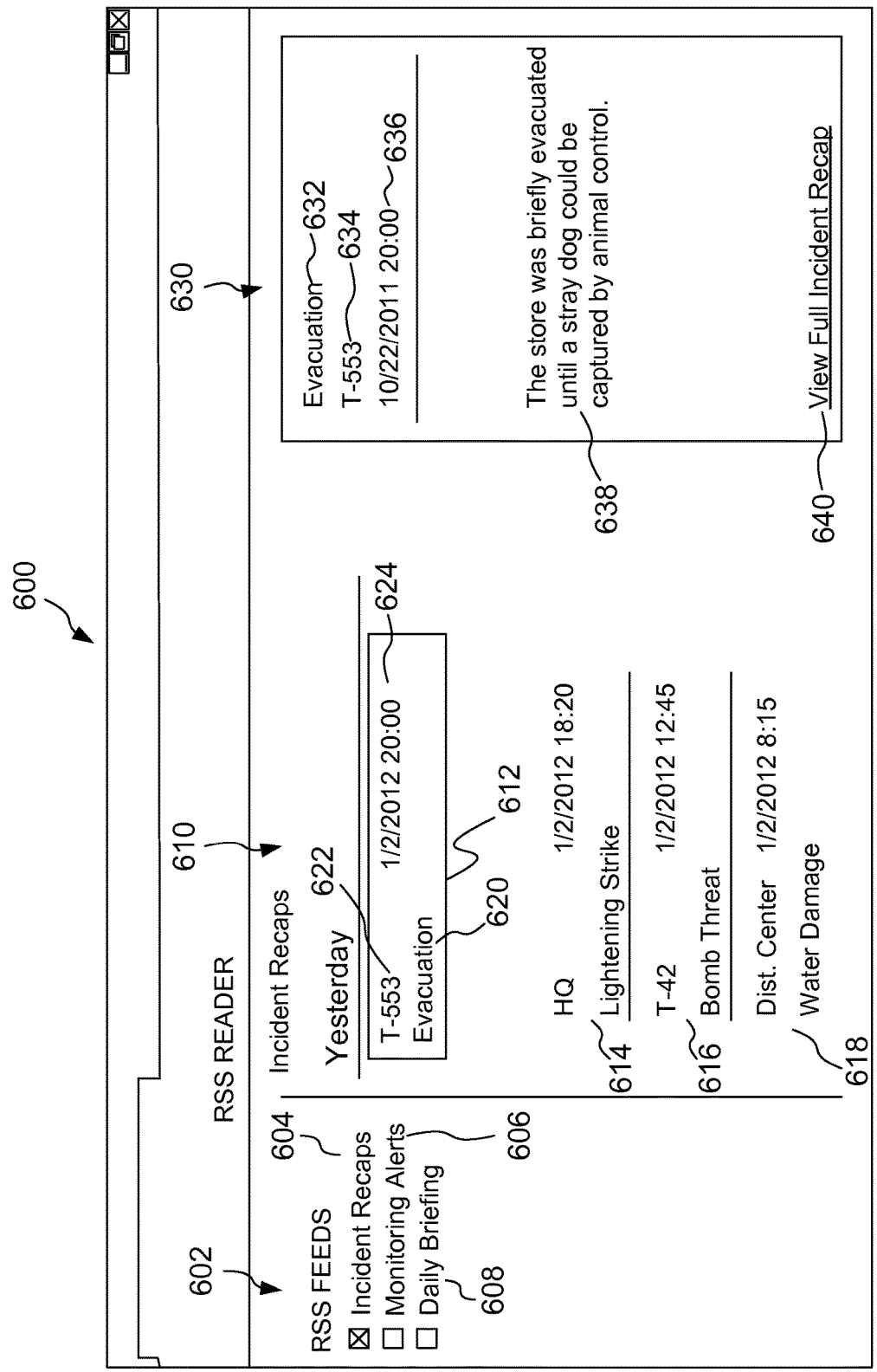
FIG. 6 is an example of an RSS reader showing incident recaps.

FIG. 6 provides an example of an RSS reader interface 600 showing an incident recap RSS feed. RSS reader interface 600 includes RSS feed selection column 602 that allows a user to select between incident recap feed 604, monitoring alert feed 606, and daily briefing feed 608. RSS reader interface 600 also includes incident recap list 610 which contains a list of incident recaps 612, 614, 616, and 618 organized based on date and time. Each incident recap entry in the list of incident recaps 610 includes a title such as title 620, a location affected by the incident such as incident location 622, and a date and time when the incident occurred such as date and time 624. RSS reader interface 600 also includes an incident recap display column 630 that displays one of the incident recap feeds of column 610 when it is selected. Incident recap column 630 displays a title 632, a location 634, and a date and time 636, which are the same as the title, location and date and time of the associated incident recap entry in the list of incident recaps 610. Incident recap summary 630 also includes a synopsis 638 of the incident and a link 640 containing a URL for the full incident recap 152. Selecting link 640 causes a page to be opened displaying the full incident recap 152, typically within a web browser.

Figure 7:
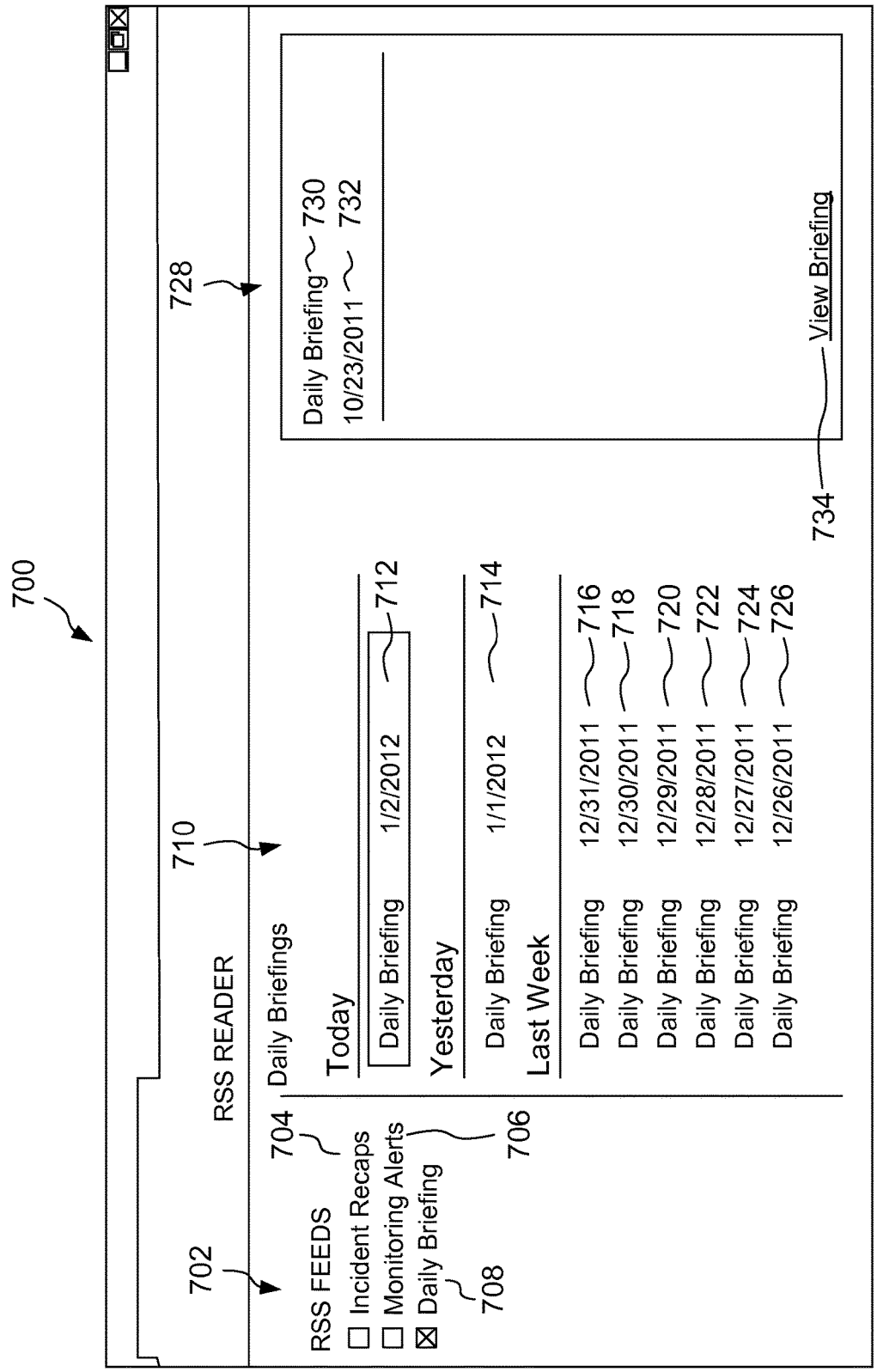
FIG. 7 is an example of an RSS reader showing daily briefings.

FIG. 7 provides an example of a RSS reader interface 700 showing a RSS feed of daily briefings. RSS reader interface 700 includes RSS feed selection column 702, which allows a user to select between incident recap feed 704, monitoring alerts feeds 706, and daily briefing feed 708. In RSS reader interface 700, daily briefing feed 708 has been selected. RSS reader interface 700 also includes a RSS feed list 710 which includes a list of dialing briefing feeds 712, 714, 716, 718, 720, 722, 724, and 726 organized by date. As shown in FIG. 7, there is a single daily briefing per day. RSS reader interface 700 also includes a display column 728 for displaying a selected daily briefing feed found in list 710. For example, the daily briefing feed for list entry 712 is displayed in FIG. 7. Daily briefing display area 728 includes a title 730 and a date 732 for the daily briefing. Daily briefing display area 728 also includes a link 734 that links to a daily briefing document/page. In accordance with one embodiment, when link 734 is selected by the user, the associated daily briefing page is displayed within a browser window.

Figure 8:
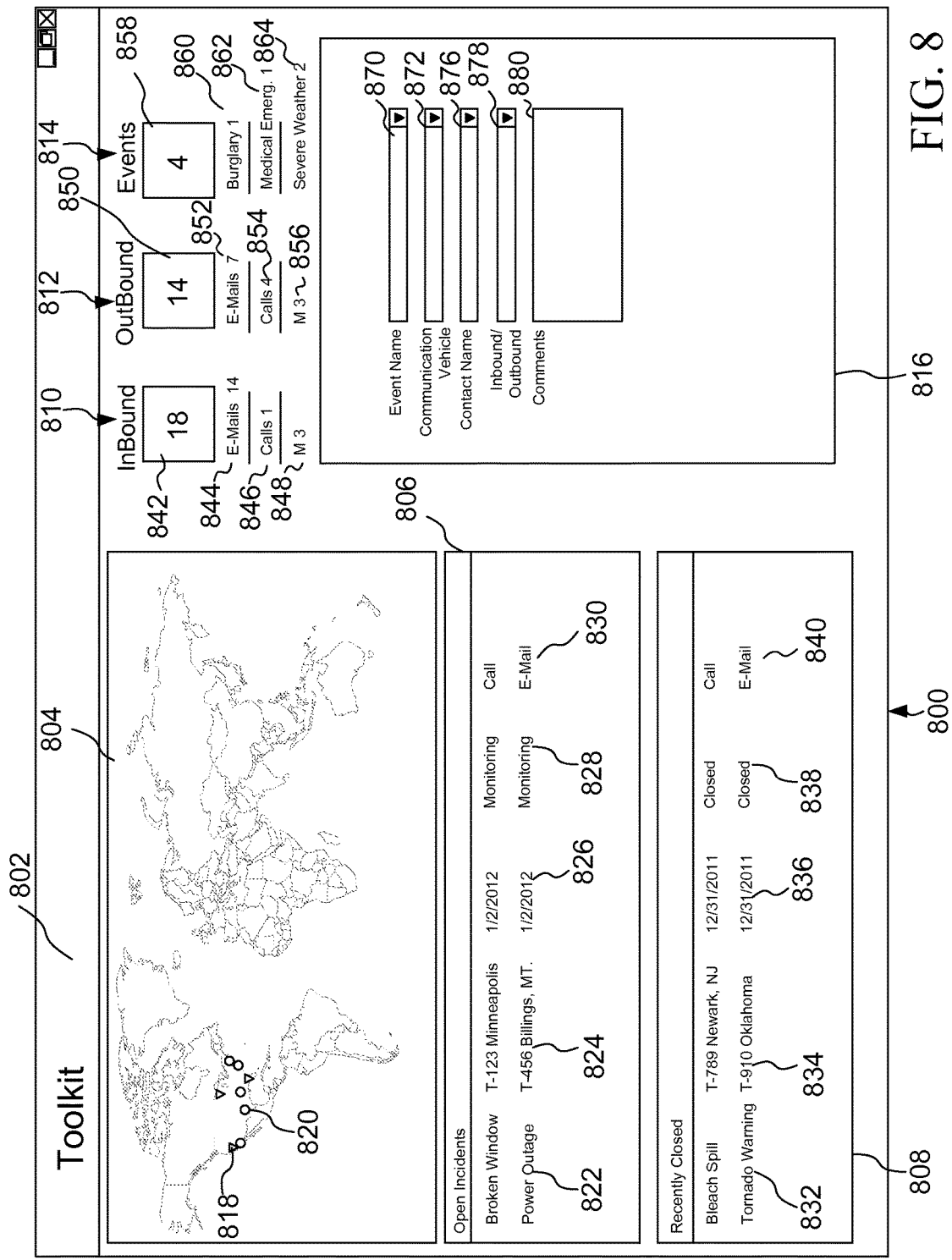
FIG. 8 is an example of a toolkit page.

Monitoring alerts list 130 and incident recaps list 132 are also used in the construction of a command center toolkit 158 of FIG. 1. Command center toolkit 158 is a document or webpage that displays open incidents that are being monitored, recently closed incidents, a map showing the location of incidents, and a tally of communications and events for the day. FIG. 8 shows an example of a command center toolkit page 800. Page 800 includes a header 802, a map 804, a list of open incidents 806, a list of recently closed incidents 808, an inbound communication list 810, an outbound communication list 812, an events list 814 and a communication ledger 816.

Map 804 includes a depiction of a geographical region with a first icon type 818 for open incidents that are currently being monitored and a second icon type 820 for closed incidents. Open incidents list 806 includes a list of currently open incidents with each incident entry including a title such as title 822, a location affected such as location 824, a date the incident took place such as date 826, a status of the incident such as status 828, and a communication channel 830 that indicates how the incident was reported.

Recently closed list 808 includes an entry for each incident that was recently closed because it required no further action by the command center. Each entry in closed list 808 includes a title such as title 832, a location that was affected by the incident such as location 834, a date the incident took place such as date 836, a status such status 838, and a communication channel such as communication channel 840, which indicates the means used to report the incident to the command center.

Inbound communication log 810 provides a number 842 of inbound communications received today broken down by the number of emails 844, the number of calls 846, and the number of instant messages 848. Similarly, outbound communication log 812 provides the number of outbound communications 850 breakdown by the number of emails 852, the number of calls 854, and the number of messages 856. Events ledger 814 provides the number 858 of incidents that occurred today broken down by incident type such as the number of burglaries 860, the number of medical emergencies 862, and the number of severe weather events 864.

Event ledger 816 allows a user at a command center to enter information about a communication made relative to an incident. It includes an incident name pull-down field 870, which provides event names that are populated by incidents in incident recap list 132 and incidents in monitoring list 130. Communication vehicle field 872 allows the user to designate the channel of communication used for the present interaction. Contact name field 876 is used to designate the name of the user in the command center involved in the communication. Inbound/outbound field 878 indicated whether this communication was inbound or outbound. Comment section 880 allows the command center user to indicate the substance of the communication.

Status list 106 may also be used to construct a daily briefing.

Figure 9:
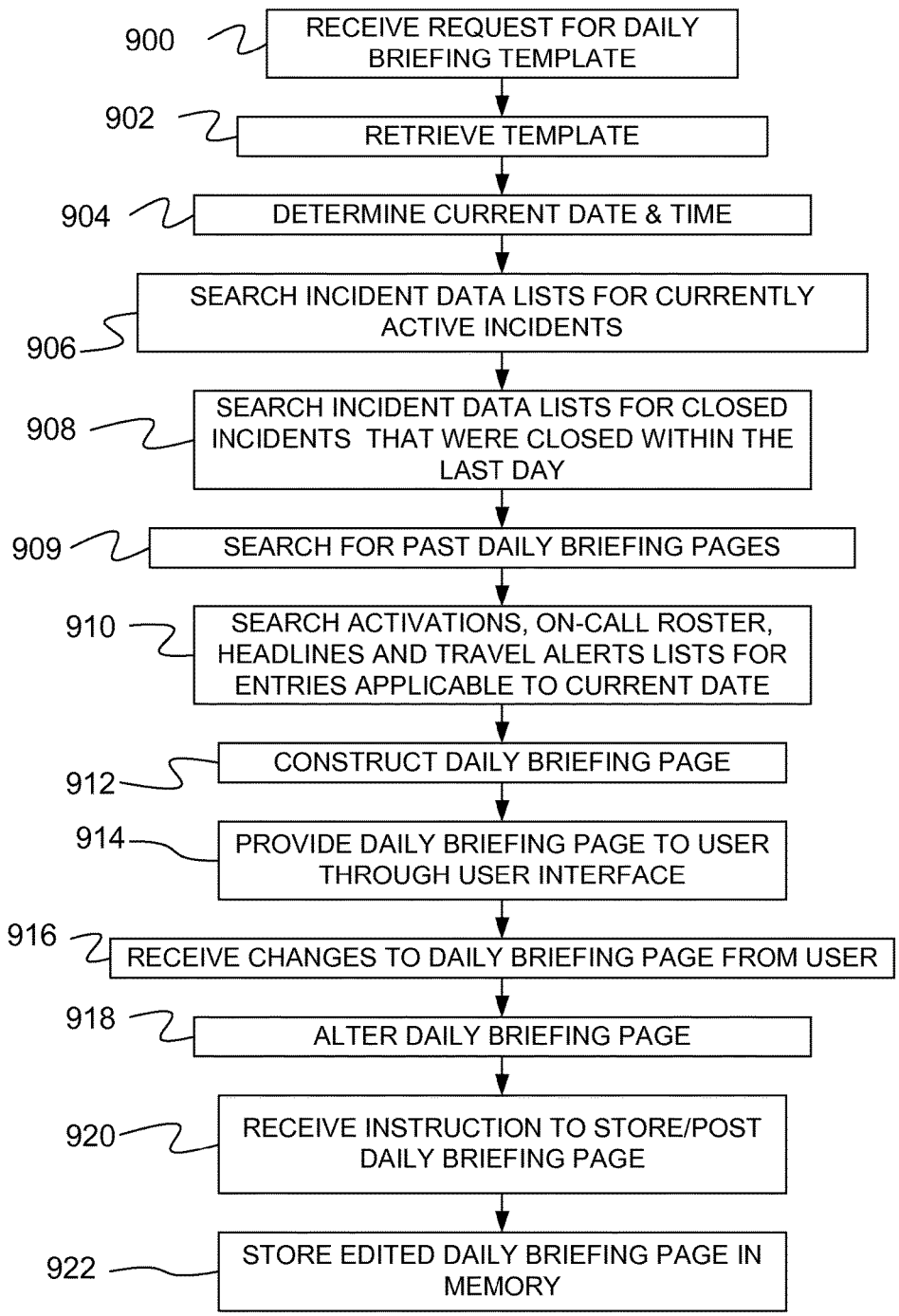
FIG. 9 is a flow diagram for constructing a daily briefing.

FIG. 9 provides a flow diagram of a method for constructing a daily briefing page. In step 900 of FIG. 9, a request for a daily briefing template is received. At step 902 a daily briefing template is retrieved such as daily briefing template 160 of FIG. 1. At step 904, a current date and time is determined. Daily briefing template 160 includes fields that are to be populated with entries from one or more of the status lists 106 while using the date and time determined in step 904 as a filter 162. In particular, at step 906, based on information and instructions in daily briefing template 160, a search of monitoring alerts list 130 is performed to identify all currently active incidents as of date 162. At step 908, a search is performed of incident recaps list 132 for closed incidents that were closed within one day of current date 162. In accordance with one embodiment, the currently active incidents and the closed incidents affected at least one facility associated with a same corporation or government agency. At step 909, a search is performed to identify links for the last five daily briefings. In step 910, searches of activations list 136, on-call roster 138, command center headlines 116, global headlines 128, and travel alerts 134 are performed to find entries applicable to current date 162 based on search instructions in daily briefing template 160.

The entries found in steps 906, 908, and 910 are used to construct a daily briefing at step 912 by inserting the information into briefing template 160. The constructed daily briefing page is then provided to a user through a user interface at step 914 such that the user may edit the constructed daily briefing. User edits 164 received from the user are used at step 918 to alter the constructed daily briefing page to produce edited daily briefing 166.

At step 920, an instruction is received to store edited daily briefing 166. Information in edited daily briefing 166 is then stored at step 922 in a daily briefing list 168. The daily briefing list 168 may include columns for URLs to previous daily briefing list entries; URLs to monitoring alerts with a summary, date, and title of each monitoring alert; a URL to an incident recap page with a date, title, and summary of each incident; a title, date, summary and URL to a global headline; a title, date, category and URL for a travel alert; a name, phone number and on-call status for a command center employee who is on-call; and a title, status, and date for any active activations in the modified daily briefing 166.

Daily briefing list 168 can then be used to generate a daily briefing document page 170. In particular, daily briefing document page 170 includes a layout and search instructions for searching for information to fill out the daily briefing from daily briefing list 168.

In accordance with one embodiment, the daily briefing page is constructed once per day from incident data in the incident lists including monitoring alert list 130 and incident recaps list 132. As such, incident data added to the incident lists after the daily briefing page is constructed are not included in the daily briefing.

Figure 10:
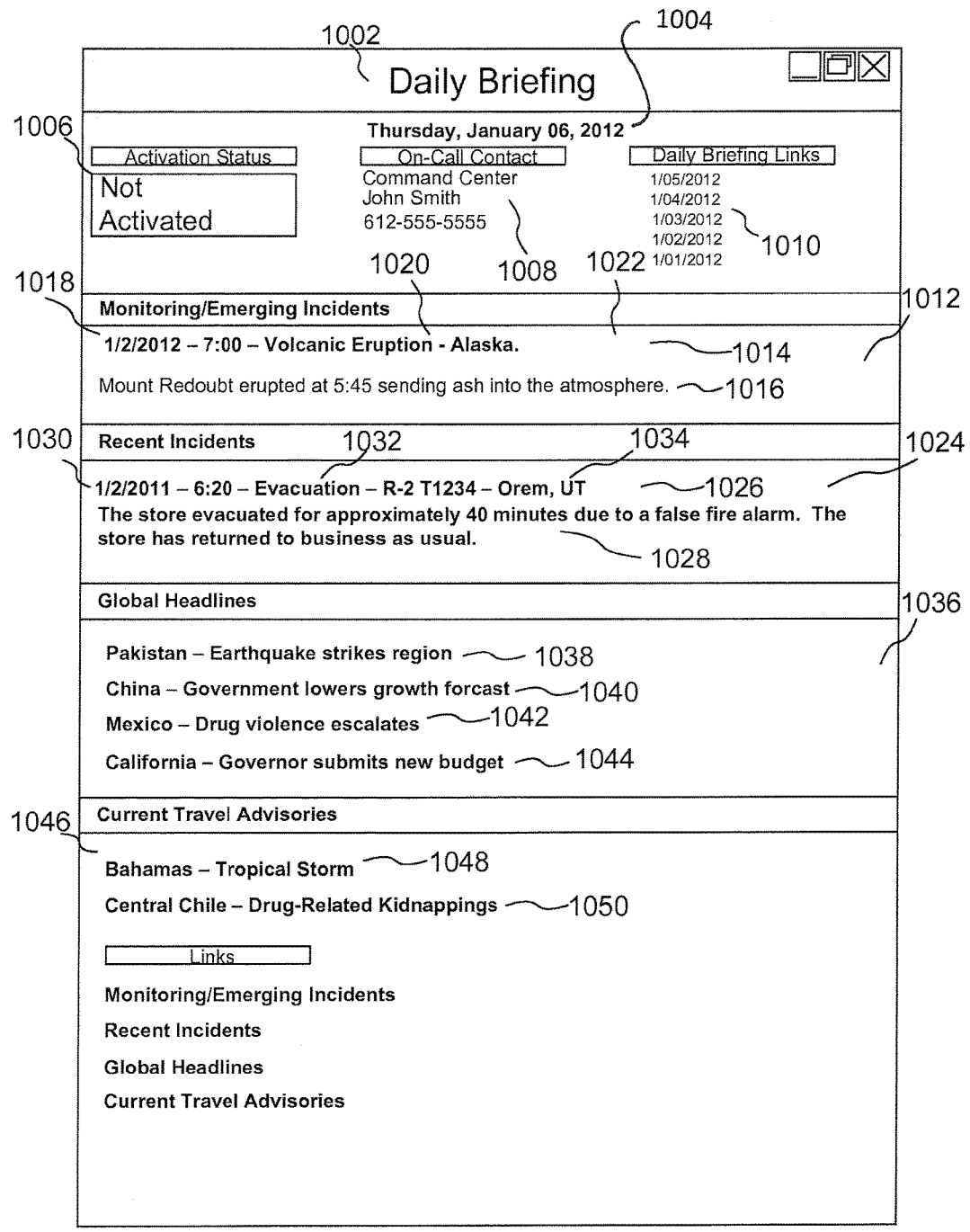
FIG. 10 is an example of a daily briefing.

FIG. 10 provides an example of a daily briefing page 1000 constructed from data in daily briefing list 168. Daily briefing page 1000 is provided to the user when the user selects a link to the page such as link 734 in the RSS feed of FIG. 7 or other links discussed further below. Daily briefing page 1000 includes a header 1002, a date 1004, an activation status 1006, an on-call contact area 1008 and daily briefing links 1010. Activation status 1006 indicates whether a response team is currently activated for any incidents. On-call contact area 1008 lists the on-call contact taken from daily briefing list 168 which was populated from on-call roster 138. Daily briefing links 1010 includes a list of links to previous daily briefing pages, which in accordance with one embodiment is a list of the previous five daily briefings. Daily briefing page 1000 also includes a monitoring incident area 1012, which contains entries for each of a plurality of events that are currently being monitored. Each entry in monitoring incidents 1012 includes a link such as link 1014 to the monitoring alert page for the event such as monitoring alert page 150 of FIG. 1. Link 1014 includes text describing the date 1018 of the incident, the title 1020 of the incident, and locations 1022 affected by the incident. Each entry also includes a summary of the incident, such as summary 1016.

Daily briefing page 1000 also includes a recent incidents area 1024 that has a list of entries for incidents that have been closed within the last day. Each entry in recent incidents 1024 includes a link, such as link 1026, and a summary, such as summary 1028. Each link includes text information that describes the date 1030 of the incident, a title 1032 for the incident, and a location 1034 affected by the incident. When selected, each link causes an incident recap page such as incident recap page 400 of FIG. 4 to be displayed. Each summary provides a summary of the incident.

Daily briefing page 1000 also includes a global headlines area 1036 that includes links 1038, 1040, 1042, and 1044. When selected, each link causes a respective global headlines page to be displayed, which provides detailed information about the global headline.

Daily briefing page 1000 also includes a current travel advisory section 1046 that includes links 1048 and 1050 to travel alert pages describing travel alerts that are effective for the current date.

Figure 11:
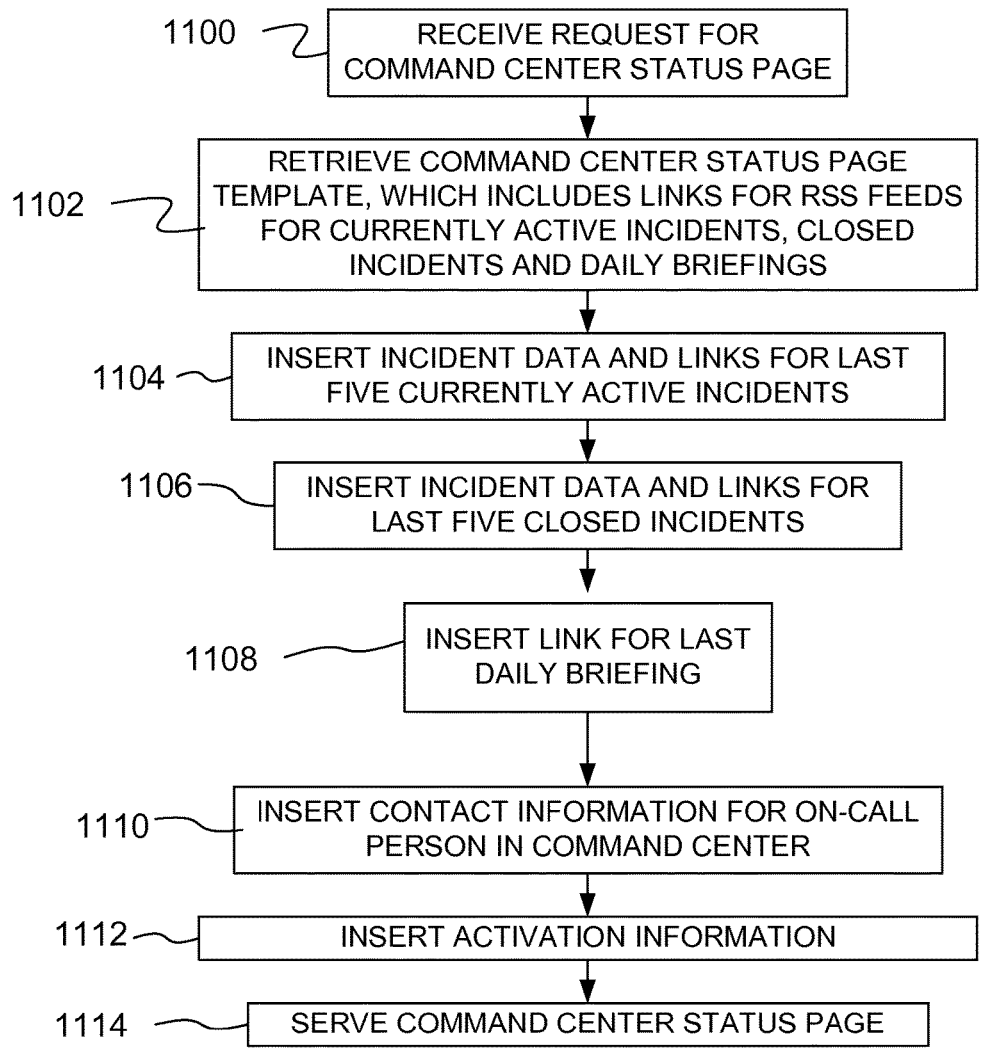
FIG. 11 is a flow diagram for constructing a status page.

The information in status lists 106 can also be used to generate a command center status page 174. FIG. 11 provides a method of steps used to construct a command center status page.

In step 1100, a request for the command center status page is received. In step 1102, the command center status page template is retrieved that includes RSS feed buttons for incidents that are being monitored, for closed incidents, and for daily briefings. In step 1104, incident data and links for a last five incidents that are being monitored, are inserted into the status page using information from monitoring alerts list 130. At step 1106, incident data and links for the last five closed incidents in incident recaps list 132 are inserted into the command center status page. At step 1108, links for the last daily briefing is inserted from daily briefing list 168. At step 1110, contact information for the on-call person in the command center is inserted from on-call roster 138 and at step 1112, activation information from activations 136 is inserted. At step 1114, the command center status page is served to a user through a user interface, typically through a browser page.

Figure 12:
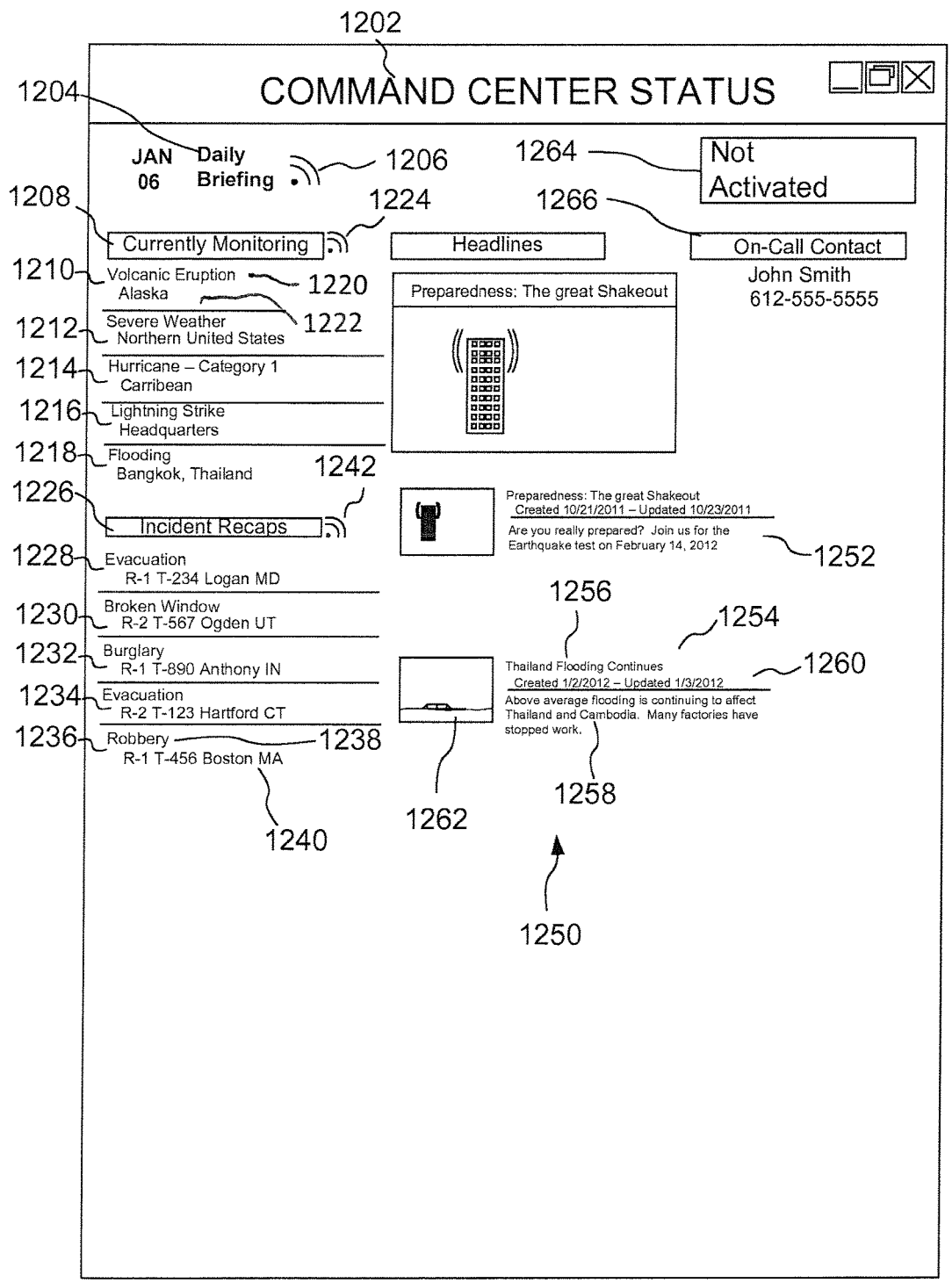
FIG. 12 is an example of a status page.

FIG. 12 provides an example of a command center status page 1200. In status page 1200, there is a header 1202, a daily briefing link 1204, and a daily briefing RSS content feed link 1206. Daily briefing link 1204 is a link to a daily briefing page 170 and when selected causes the daily briefing page to be displayed. RSS content feed link 1206 provides a URL to the RSS content feed 172 of daily briefing list 168. This URL may be added to an RSS reader so that the RSS reader will periodically request the RSS feed 172 for the latest daily briefing.

Status page 1200 also includes a currently monitoring section 1208 that includes entries 1210, 1212, 1214, 1216, and 1218 for incidents that are currently being monitored by the command center as listed in monitoring alerts list 130. Each of entries 1210, 1212, 1214, 1216, and 1218 provides a link to an incident page in the form of a monitoring alert page such as page 300 of FIG. 3. Thus, currently monitoring section 1208 includes a list of links to incident pages. Each entry in monitoring section 1208 includes a title, such as title 1220, and an affected location, such as location 1222. Status page 1200 also includes an RSS content feed link 1224 that provides a URL for a RSS content feed 154 for incident data added to monitoring alerts list 130. This URL may be provided to an RSS reader such that the RSS reader will periodically request RSS content feed 154 to obtain the latest monitoring alerts.

Status page 1200 also includes incident recap area 1226 which includes entries 1228, 1230, 1232, 1234 and 1236 for the last five most-recently closed incidents. Each closed incident entry provides a link to an incident page in the form of an incident recap page, such as incident recap page 400 of FIG. 4. Each closed incident entry also includes a title, such as title 1238, and a location affected by the incident, such as location 1240. Thus, incident recap area 1226 includes a list of links to incident pages. Status page 1200 also includes an RSS content feed link 1242 that provides a URL to a RSS content feed 156 of incident data added to incident recaps list 132. The URL associated with link 1242 may be inserted into an RSS reader such that the RSS reader will periodically request recently closed incidents.

Status page 1200 also includes a command center headlines area 1250 that includes headlines taken from command center headlines list 126. Command center headline area 1250 includes headline entry 1252 and headline entry 1254. Each entry includes a title such as title 1256, a summary such as summary 1258, and a date and time such as date/time 1260. In addition, some entries may include an image such as image 1262 associated with the headline.

Status page 1200 also includes an activation area 1264 that indicates whether a response team is currently activated. Status page 1200 also includes on-call contact information 1266 that indicates the current person on-call in the command center. The activation status and the on-call information are taken from activations list 136 and on-call roster list 138, respectively.

Figure 13:
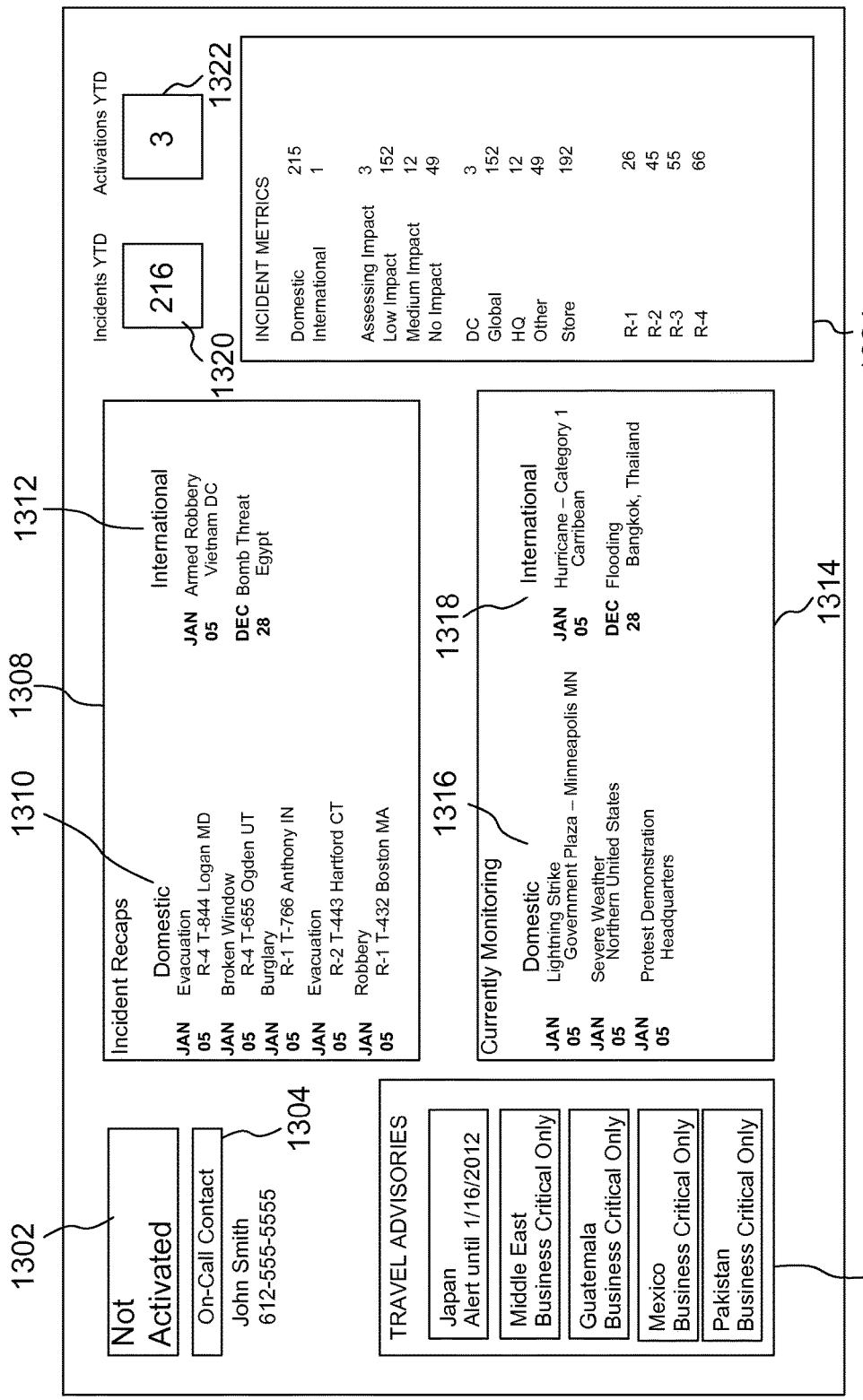
FIG. 13 is an example of a status board.

Status lists 106 may also be used to create a status board 176. A status board is a webpage similar to the status page of FIG. 12 but is intended to display information without the need to interact with the displayed information. FIG. 13 provides an example of such a status board 1300.

In FIG. 13, the status board is shown to include an activation area 1302, which indicates whether a team is currently activated to respond to an incident and which is populated with information from activations list 136. Status board 1300 also includes an on-call area 1304 that indicates contact information for the command center employee who is currently on-call. The information in on-call area 1304 is taken from on-call roster list 138. A travel advisory list area 1306 lists all current travel advisories and is populated with data from travel alerts list 134. An incidents list 1308 provides a list of the eight most recent incidents separated into the four most recent domestic incidents 1310 and the four most recent international incidents 1312. This information is taken from incident recaps list 132. Monitoring alerts area 1314 provides a list of incidents that are currently being monitored and is populated with data from monitoring alerts list 130. Monitoring alerts area 1314 is separated into domestic alerts 1316 and international alerts 1318. A year to date incident count 1320 provides the number of incidents that have occurred during the year and an activations count 1322 provides the number of times response teams have been activated to respond to incidents during the current year. An incident metric list 1324 provides breakdowns of the types of incidents, the impact level of those incidents, the types of facilities that those incidents took place in, and the regions where those incidents took place. This information is captured from incident recaps list 132.

Figure 14:
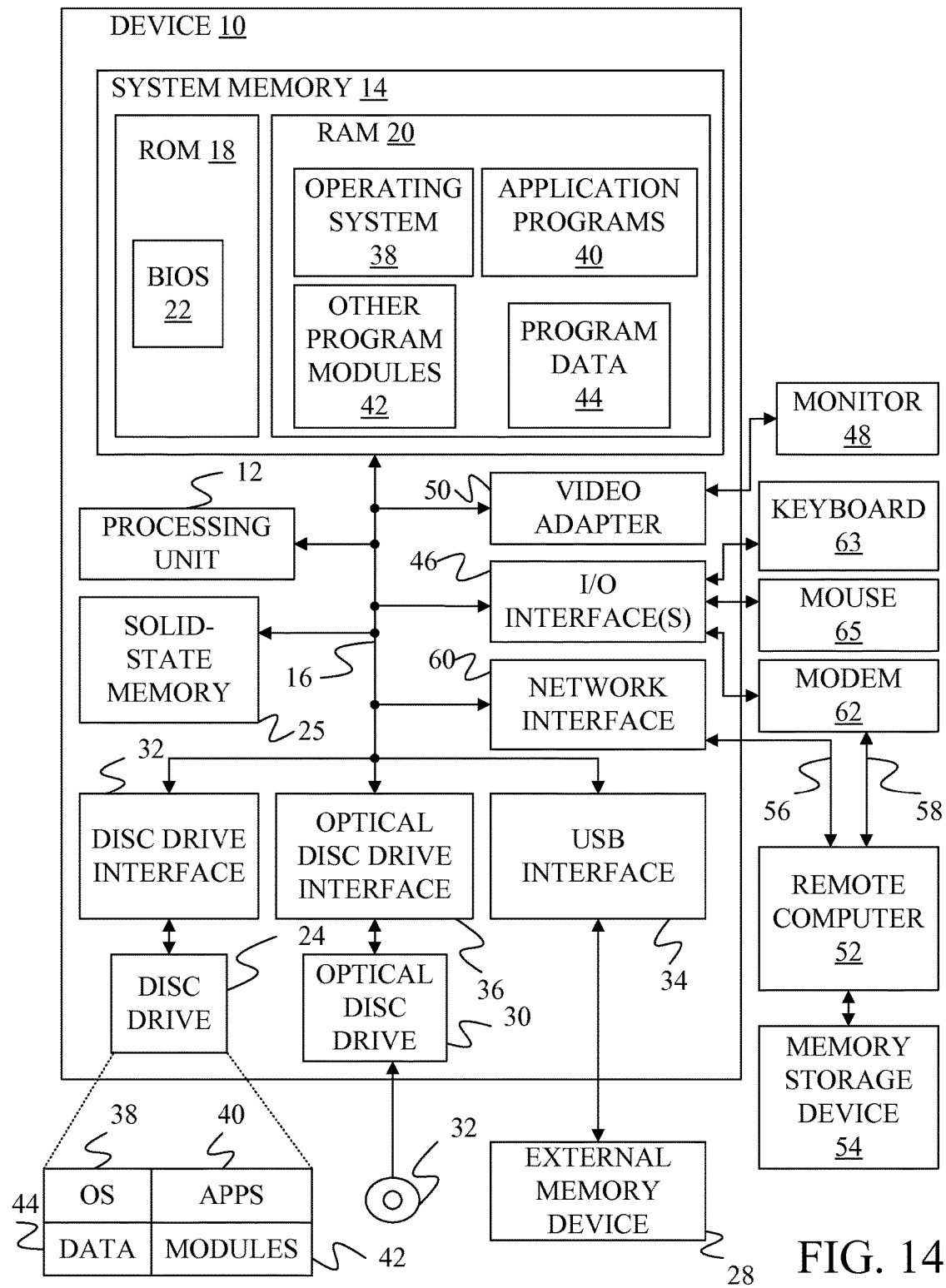
FIG. 14 is a block diagram of an example of a computing device that may be used as either a server or a client device.

An example of a computing device that can be used as a server and/or client device in the various embodiments is shown in the block diagram of FIG. 14. The computing device 10 of FIG. 14 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include command center system 100. Program data 44 may include text, images, documents and videos stored in input lists 102, input forms 104, status lists 106 and the output pages described above.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 14. The network connections depicted in FIG. 14 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program, such as data stored in the databases or lists described above, may illustratively be stored within memory storage device 54. It will be appreciated that the network connections shown in FIG. 14 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A command center system that collects information about incidents using incident input forms as well as information about global headlines, travel alerts and command center on-call personnel and stores information in data structures that are accessed to generate a daily briefing page to employees about currently occurring events, recently resolved events, global news events and travel alerts that pose a threat to employees, comprising:
    incident input forms configured to receive incident data describing an incident that affects employee travel to a facility;
    at least one incident first that is populated with incident data from the incident input forms;
    at least one computer for providing a command center status page, wherein the command center status page comprises:
    a monitoring section including a list of links to incident pages for a set of incidents, each incident page constructed in part from incident data in the at least one incident list;
    a monitoring alerts document dynamically constructed based on data contained in an incident page about currently active incidents that continue to be monitored by command center personnel;
    an incident content feed link for a content feed of incident data added to the at least one incident list;
    a daily briefing link to a current daily briefing page that is constructed once per day from incident data in the at least one incident list such that incident data that are added after the current daily briefing page is constructed are not included in the current daily briefing page;
    a daily briefing content feed link for a content feed of daily briefing pages; and,
    said at least one computer further including a display for displaying a user interface to command center personnel, said user interface being configured to:
    receive changes to the current daily briefing page for use in constructing an edited daily briefing page; and
    receive an instruction to store the edited current daily briefing page; and
    in response to the instruction to store the edited current daily briefing page, storing the edited current daily briefing page in memory.

2. The command center system of claim 1 wherein the command center status page further comprises contact information for a person on-call in a command center.

3. The command center system of claim 1 wherein the current daily briefing page comprises a summary of at least one incident.

4. The command center system of claim 3 wherein the current daily briefing page further comprises links to previous daily briefing pages.

5. The command center system of claim 1 wherein the current daily briefing page further comprises links to travel alert pages.

6. The command center system of claim 1 wherein the current daily briefing page and the command center status page further comprise headlines.

7. The command center system of claim 1 wherein the list of links to incident pages comprises a list of links to incident recap pages for a set of closed incidents.

8. The command center system of claim 7 wherein the incident content feed link comprises a content feed link for a content feed of incident data for closed incidents.

9. The command center system of claim 1 wherein the current daily briefing page may be edited by the user.

10. A method for constructing a daily briefing page using information about incidents using incident input forms as well as information about global headlines, travel alerts and command center on-call personnel and stores information in data structures that are accessed to generate a daily briefing page to employees about currently occurring events, recently resolved events, global news events, travel alerts and response team activations, comprising:
    retrieving a daily briefing template in response to a user input;
    determining a current date and time;
    searching, by a processor, incident data lists stored in memory to retrieve information about currently active incidents that affect employee travel;
    searching, by a processor, the incident data lists to retrieve information about closed incidents; searching, by a processor, global headline lists stored in memory for information about global headlines that are applicable to the current date and time;
    constructing, by a processor, a daily briefing page by inserting the information about currently active incidents, the information about closed incidents and the information about global headlines into the briefing template;
    providing the constructed daily briefing page to a user at a command center through a user interface; and
    providing the constructed daily briefing page such that a user may edit the constructed daily briefing page; and
    receiving changes to the constructed daily briefing page and altering the constructed daily briefing page to form an edited daily briefing page;
    receiving an instruction to store the edited daily briefing page; and
    in response to the instruction to store the edited daily briefing page, storing the edited daily briefing page in memory.

11. The method of claim 10 wherein the currently active incidents and the closed incidents each affected at least one facility associated with a same corporation.

12. The method of claim 10 further comprising receiving a request for a feed of a daily briefing page and in response returning a link to the edited daily briefing page.

13. The method of claim 10 wherein constructing a daily briefing page further comprises inserting links to daily briefing pages constructed for other days.

14. A non-transitory computer-readable medium comprising computer-executable instructions that when executed by a processor cause the processor to perform steps comprising:
   receiving incident data through a form comprising at least one pull-down menu that is used to select a location where an incident occurred from a collection of preset locations;
   constructing a daily briefing through steps comprising:
   selecting incident data to include in the daily briefing based in part on a current date;
   selecting travel alerts to include in the daily briefing based in part on the current date;
   selecting headlines to include in the daily briefing based in part on the current date;
   providing the daily briefing to employees about currently occurring events, recently resolved events, global news events and travel alerts that pose a threat to employees; and
   receiving changes to the constructed daily briefing and altering the constructed daily briefing to form an edited daily briefing;
   receiving an instruction to store the edited daily briefing; and
   in response to the instruction to store the edited daily briefing, storing the edited daily briefing in memory.

15. The non-transitory computer-readable medium of claim 14 further comprising receiving a request for an RSS feed of the daily briefing and in response providing a uniform resource locator for the altered daily briefing.

16. The non-transitory computer-readable medium of claim 14 wherein constructing the daily briefing further comprises inserting links to a plurality of past daily briefings into the daily briefing.

17. The non-transitory computer-readable medium of claim 14 further comprising:
   receiving a request for a command center status page; and
   constructing the command center status page through steps comprising:
      inserting in the command center status page incident data for a collection of incidents;
      inserting an RSS feed link in the command center status page to allow a user to request a RSS feed of incident recap reports;
   inserting in the command center status page a link to the daily briefing; and
   inserting an RSS feed link in the command center status page to allow a user to request a RSS feed of daily briefings.

18. The non-transitory computer-readable medium of claim 17 wherein constructing the command center status page comprises inserting contact information for an on-call person in the command center.

19. The non-transitory computer-readable medium of claim 14 further comprising inserting an indication of whether a response team has been activated for the incident.

* * * * *